US005632467A

United States Patent [19]

Just et al.

[11] Patent Number: 5,632,467

[45] Date of Patent: May 27, 1997

[54] VALVE NEEDLE FOR AN ELECTROMAGNETICALLY ACTUATED VALVE

[75] Inventors: Bernhard Just, Kernen; Ferdinand Reiter, Markgroeningen, both of Germany

[73] Assignee: Robert Bosch GmbH, Stuttgart, Germany

[21] Appl. No.: 436,066

[22] Filed: May 5, 1995

[30] Foreign Application Priority Data

May 5, 1994 [DE] Germany .......................... 44 15 850.5

[51] Int. Cl.$^{6}$ .................................................... F16K 31/06

[52] U.S. Cl. ................................. 251/129.21; 239/585.4; 239/900

[58] Field of Search .................... 251/129.21; 239/585.4, 239/585.1, 585.5, 900; 264/242; 419/5–9, 38, 40; 29/890.123, 890.127, 890.12, 890.124, 527.5, 527.6

[56] References Cited

U.S. PATENT DOCUMENTS

| | | |
|---|---|---|
| 4,483,485 | 11/1984 | Kamiya et al. . |
| 5,178,362 | 1/1993 | Vogt et al. . |

FOREIGN PATENT DOCUMENTS

| | | | |
|---|---|---|---|
| 3244290 | 6/1983 | Germany . | |
| 3439672 | 4/1986 | Germany | 239/585.4 |
| 4008675 | 9/1991 | Germany . | |
| 4230376 | 4/1993 | Germany . | |
| 0932033 | 5/1982 | U.S.S.R. | 251/129.21 |

*Primary Examiner*—Edward K. Look
*Assistant Examiner*—Christopher Verdier
*Attorney, Agent, or Firm*—Kenyon & Kenyon

[57] ABSTRACT

A valve needle includes a valve needle section which connects the armature section and the valve closing element section, the valve needle section having a solid construction. In order to ensure that the fuel flows in the direction of the valve seat, at least two axial grooves are provided in the armature section. The axial grooves in the armature section are constructed in such a way that the emerging fuel can flow along the outer circumference of the valve needle section in the direction of the valve seat. The valve needle is particularly suitable for injection valves in fuel injection systems of mixture-compression, spark-ignition internal combustion engines.

10 Claims, 3 Drawing Sheets

Fig. 2
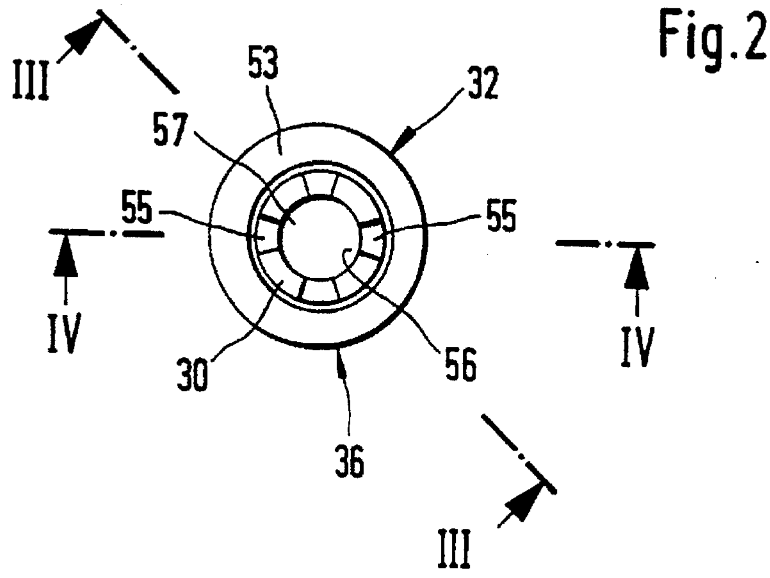
Fig. 4
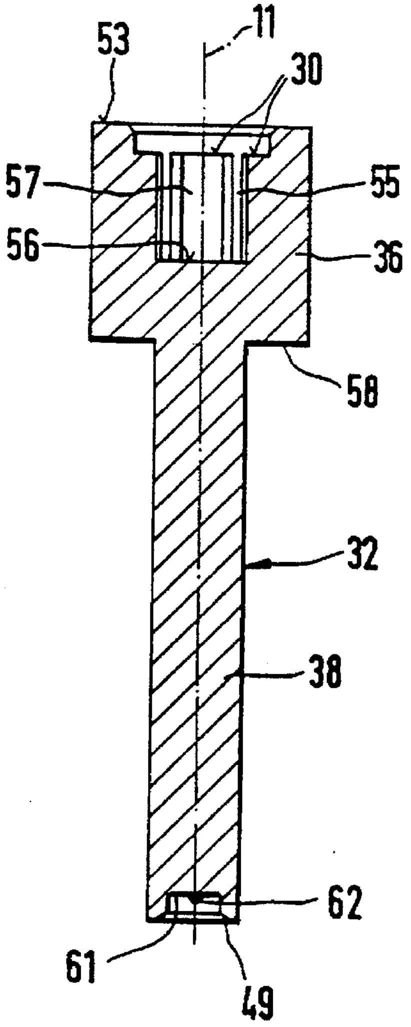
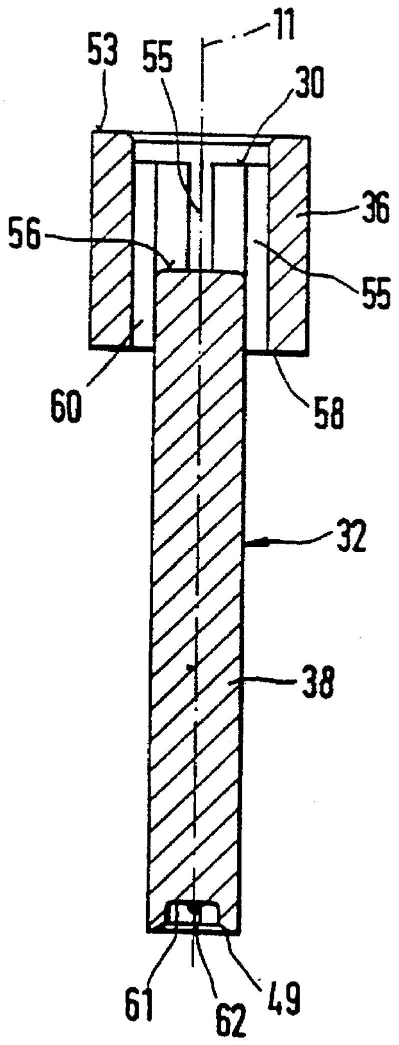
Fig. 3

VALVE NEEDLE FOR AN ELECTROMAGNETICALLY ACTUATED VALVE

FIELD OF THE INVENTION

The present invention relates to a valve needle for an electromagnetically actuated valve.

BACKGROUND INFORMATION

German Patent Application No. DE-A 32 44 290 describes a valve needle for an electromagnetically actuated valve which includes an armature section, a valve closing element section and a tubular valve sleeve section which connects the armature section to the valve closing element section. The individual sections constitute individual components which are produced separately from one another and only connected to one another using joining methods.

A valve needle for an electromagnetically actuated valve is also described in German Patent Application No. DE-A 40 08 675. The valve needle includes an armature section, a valve closing element section and a valve sleeve section which connects the armature section to the valve closing element section. The armature section is connected to one end of the valve sleeve section by means of a first weld joint and the valve closing element section is connected to the other end of the valve sleeve section by means of a second weld joint. Therefore, two welding operations are necessary to produce the valve needle, which makes the production of the valve needle relatively complex and expensive.

Furthermore, German Application No. DE-PS 42 30 376 describes how a valve needle for an electromagnetically actuated valve is manufactured from a single-component tubular actuation part, including an armature section and a valve sleeve section, by injection-molding and subsequent sintering according to the metal-injection-molding (MIM) method. Subsequently, the actuation part is connected to a valve closing element section by means of a weld joint. Here, a continuous inner longitudinal opening in which fuel can flow in the direction of the valve closing element section is provided in the armature section and valve sleeve section, the fuel then emerges from the valve sleeve section through lateral openings near to the valve closing element section. For the production of the valve needle with the so-called MIM method, slider tools are therefore necessary in order to form the lateral openings.

SUMMARY OF THE INVENTION

In contrast, the valve needle according to the present invention has the advantage that it can be manufactured in a particularly simple and cost-effective manner. This is achieved according to the present invention by virtue of the fact that the "valve sleeve section" is not actually a sleeve any more, but instead has a solid construction as a valve needle section between the armature section and valve closing element section. Accordingly, the tool for manufacturing the actuation part, which includes the armature section and valve needle section, can be of very simple design because no lateral slider tools are necessary to produce lateral openings. Thus, the present invention eliminates the risk of burring which was previously present at the lateral openings due to production reasons. At least two axially extending flow channels inside the armature section ensure that the fuel flows off in an unimpeded way in the direction of the valve seat. The fuel emerging from the flow channels can flow along on the outer circumference of the valve needle section without being deflected.

It is particularly advantageous to provide three or four axial grooves in the armature section. The axial grooves interrupt a mounting shoulder, facing away from the valve closing element section, for a restoring spring and ensure the passage of fuel.

It is also advantageous to provide a gate mark, during the production of the actuation part, on its end side facing the valve closing element section because during the attachment of the valve closing element section, the gate mark is covered thereby, and therefore does not need to be removed. Instead, after the welding-on of the spherical valve closing element section, the gate mark area on the valve needle section is hermetically sealed so that it cannot be the source of any negative effects.

A particularly advantageous embodiment of the valve needle according to the present invention arises when it is produced with the armature section, the valve needle section and the valve closing element section being a molded component according to the metal-injection-molding method.

BRIEF DESCRIPTION OF THE DRAWINGS

FIG. 2 shows a top view of the valve needle according to the present invention.

FIG. 3 shows a section along the line III—III in FIG. 2.

FIG. 4 shows a section along the line IV—IV in FIG. 2.

DETAILED DESCRIPTION OF THE INVENTION

Figure 1:
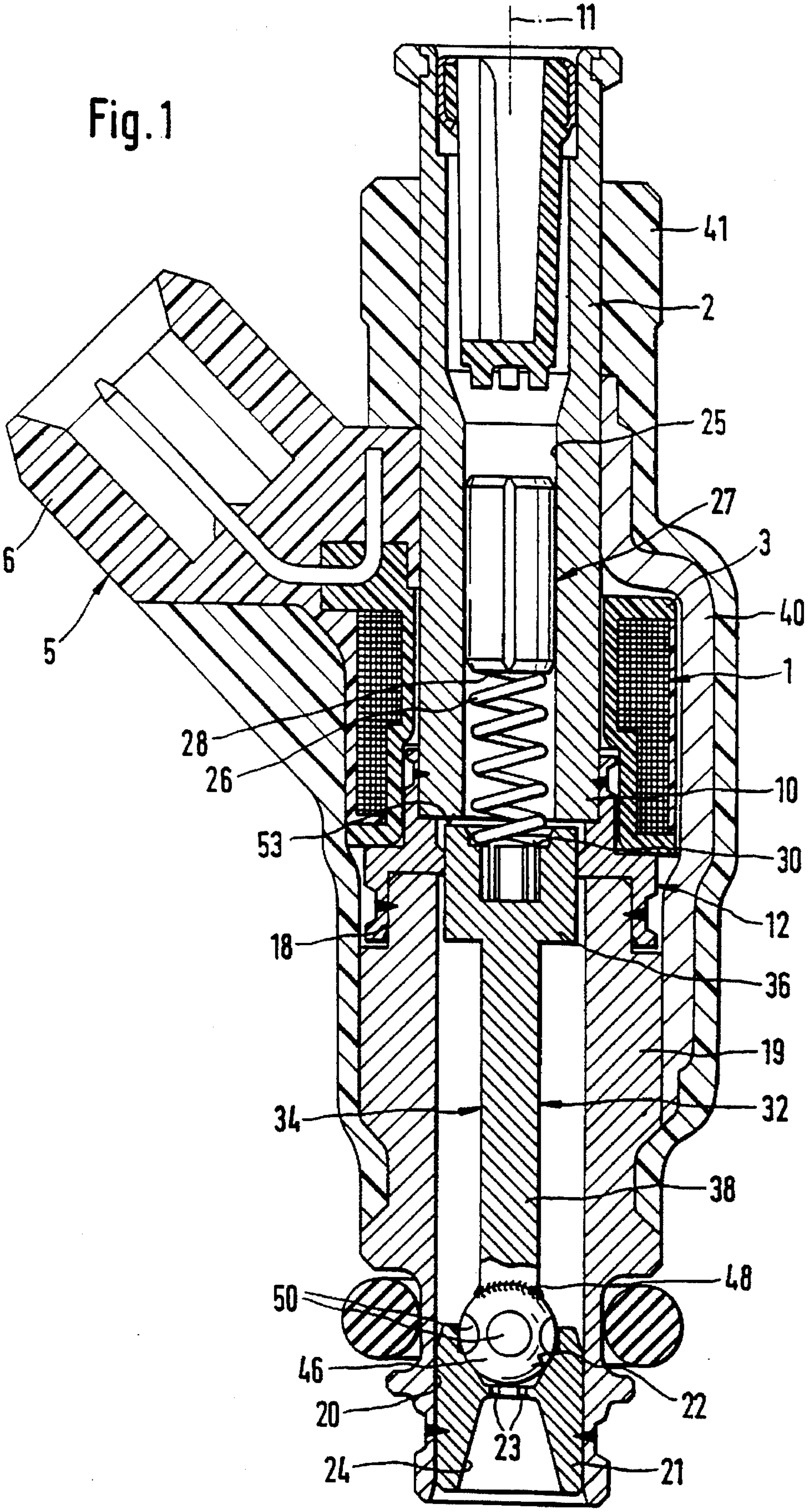
FIG. 1 shows a sectional view of a fuel injection valve with a valve needle according to the present invention.

The electromagnetically actuated valve illustrated by way of example in FIG. 1 in the form of an injection valve for fuel injection systems of mixture compressing, spark-ignition internal combustion engines has a core 2 which is surrounded by a magnetic coil 1 and serves a fuel inlet connector. The magnetic coil 1 with a coil former 3 is provided, e.g., with a plastic injection-molded encapsulation 5, an electric connection plug 6 being injection-molded on at the same time.

A tubular, metal intermediate part 12 is connected, for example by welding, concentrically to the longitudinal axis 11 of a valve to a lower end 10 of the core 2 in a sealed fashion and partially engages over the core end 10 in an axial direction. The intermediate part 12 is provided at its end facing away from the core 2 with a lower cylinder section 18 which engages over a tubular nozzle carrier 19 and is connected thereto in a sealed fashion, for example by welding.

A cylindrical valve seat element 21 is mounted in a sealed fashion, for example by welding, in a through-hole 20 running concentrically to the longitudinal axis 11 of the valve into the downstream end of the nozzle carrier 19. The valve seat element 21 has a fixed valve seat 22 facing the magnetic coil 1 and downstream thereof, two injection orifices 23 are formed in the valve seat element 21. Downstream of the injection orifices 23, the valve seat element 21 has a conditioning hole 24 which widens in the direction of flow in a truncated cone shape.

A tubular adjustment bushing 27 is pressed into a stepped flow hole 25, running concentrically with respect to the longitudinal axis 11 of the valve of the core 2 in order to adjust the spring force of a restoring spring 26. The press-in depth of the adjustment bushing 27 into the flow hole 25 of the core 2 determines the spring force of the restoring spring 26 and thus also influences the dynamic flow rate of the fuel output during the opening and closing stroke of the valve. With its end facing away from the adjustment bushing 27, the restoring spring 26 is supported on a mounting shoulder 30 of an actuation part 32 which is arranged concentrically with respect to the longitudinal axis 11 of the valve, while the restoring spring 26 rests with its other end on a lower end face 28 of the adjustment bushing 27.

The actuation part 32 is part of a valve needle 34 and itself includes an armature section 36 which faces the core 2 and interacts with the core 2 and the magnetic coil 1, and a valve needle section 38 which extends facing the valve seat element 21 and is of solid construction. Together with, e.g., a spherical valve closing element section 46 arranged at the downstream end of the valve needle section 38, the actuation part 32 forms the valve needle 34. The spherical valve closing element section 46 is connected here to the actuation part 32 in a permanent and sealed way, for example by means of a weld joint 48 which is achieved by laser welding.

In order to obtain the best possible connection and most accurate possible centering of the spherical valve closing element section 46 with respect to the actuation part 32, the valve needle section 38 of the actuation part 32 has at its downstream end a bearing face 49. The bearing face 49 faces away from the mounting shoulder 30, is located at the end side, and is, e.g., conical or of a dome shape matched to the spherical shape.

The valve needle section 38 and the valve closing element section 46 usually have a smaller diameter than the armature section 36. The spherical valve closing element section 46 has on its circumference, for example, four circular flattened portions 50 which make it easier for the fuel to flow in the direction of the valve seat 22 of the valve seat element 21. The actuation part 32 is explained in greater detail below with reference to FIGS. 2 to 4.

The magnetic coil 1 is at least partially surrounded by at least one conduction element 40 which is constructed, for example, as a clip, serves as a ferromagnetic element, rests with its one end on the core 2 and with its other end on the nozzle carrier 19, and is connected thereto, for example, by welding or soldering. Part of the valve is surrounded by a plastic encapsulation 41 which, starting from the core 2, extends in the axial direction over the magnetic coil 1 with connection plug 6 and the at least one conduction element 40.

The actuation part 32, which includes the armature section 36 and the valve needle section 38, and possibly also the valve closing element section 46 of the valve needle 34, are manufactured by injection-molding and subsequent sintering. The already known method, which is also referred to as metal-injection-molding (MIM), comprises manufacturing molded components from a metal powder with a binding agent, e.g. a plastic binding agent, for example on conventional plastic injection-molding machines, and subsequently removing the binding agent and sintering the remaining metal powder framework. The composition of the metal powder can be matched here, in a simple way, to optimal magnetic properties of the actuation part 32, including the armature section 36 and valve needle section 38, or to the optimal magnetic properties of the valve closing element section 46.

An actuation part 32 according to the exemplary embodiment of the present invention illustrated in FIG. 1 is also shown in FIGS. 2 to 4. FIG. 2 shows a top view of the actuation part 32 or the armature section 36 from an upstream end side 53 facing the core 2. In this top view, it can be clearly seen that the mounting shoulder 30, which is at a lower axial position with respect to the end side 53 and is of smaller diameter than the end side 53, is interrupted, for the purpose of supporting the restoring spring 26, by, for example, at least two, but preferable three or four axial grooves 55 which extend axially, that is, in the direction of the longitudinal axis 11 of the valve. Consequently, the restoring spring 26 rests only on the areas of the mounting shoulder 30 remaining in an annular shape between the axial grooves 55. The axial grooves 55 extend over the entire remaining length of the armature section 36 and allow the fuel coming out of the flow hole 25 of the core 2 to flow unimpeded in the direction of the valve seat 22.

FIGS. 3 and 4 are illustrations of sections along the lines III—III and IV—IV in FIG. 2. FIG. 3 shows a section which runs through the solid material starting from the mounting shoulder 30 in the axial direction of the armature section 36. FIG. 4 shows a section through two axial grooves 55 in the armature section 36. A central inner, blindhole-like recess 57 extends, for example with the same diameter as the solid valve needle section 38, starting from the mounting shoulder 30 in the armature section 36 downstream as far as an end face 56 lying opposite the bearing face 49 of the valve needle section 38, and is directly connected to the axial grooves 55.

The valve needle section 38 projects partially into the armature section 36. That is, the upstream end face 56 of the valve needle section 38 which faces the mounting shoulder 30 lies further upstream than a shoulder 58. The shoulder 58 is produced on the outer contour of the actuation part 32 from the armature section 36 to the valve needle section 38 at which the axial grooves 55 end. However, in their lower section, that is to say starting precisely from the end face 56 of the valve needle section 38, the axial grooves 55 no longer constitute grooves, but rather axial flow channels 60 which adjoin one another in an aligned manner by virtue of the complete encapsulation with material. The fuel emerges from the flow channels 60 at least partially as a wall film of the valve needle section 38 in the region of the shoulder 58 since the inner boundary of each flow channel 60 is given by the at least one surface of the valve needle section 38.

The gate mark 62 can be advantageously provided during the injection-molding of the actuation part 32 in such a way that it lies in a depression 61 at the downstream end of the actuation part 32. Before the valve closing element section 46 is attached, it is then in fact not necessary to remove the said gate mark 62, thus guaranteeing a reduction in costs. Instead, after the welding of the spherical valve closing element section 46 onto the bearing face 49 of the actuation part 32, the depression 61 is hermetically sealed to the gate mark 62 so that this area is not the source of negative effects. The MIM method can be used even more easily if, instead of the already known tubular actuation parts, the actuation parts 32 according to the present invention are manufactured with a solid valve needle section 38. The provision of lateral orifices in the area of the valve needle section 38 is then completely dispensed with.

Figure 5:
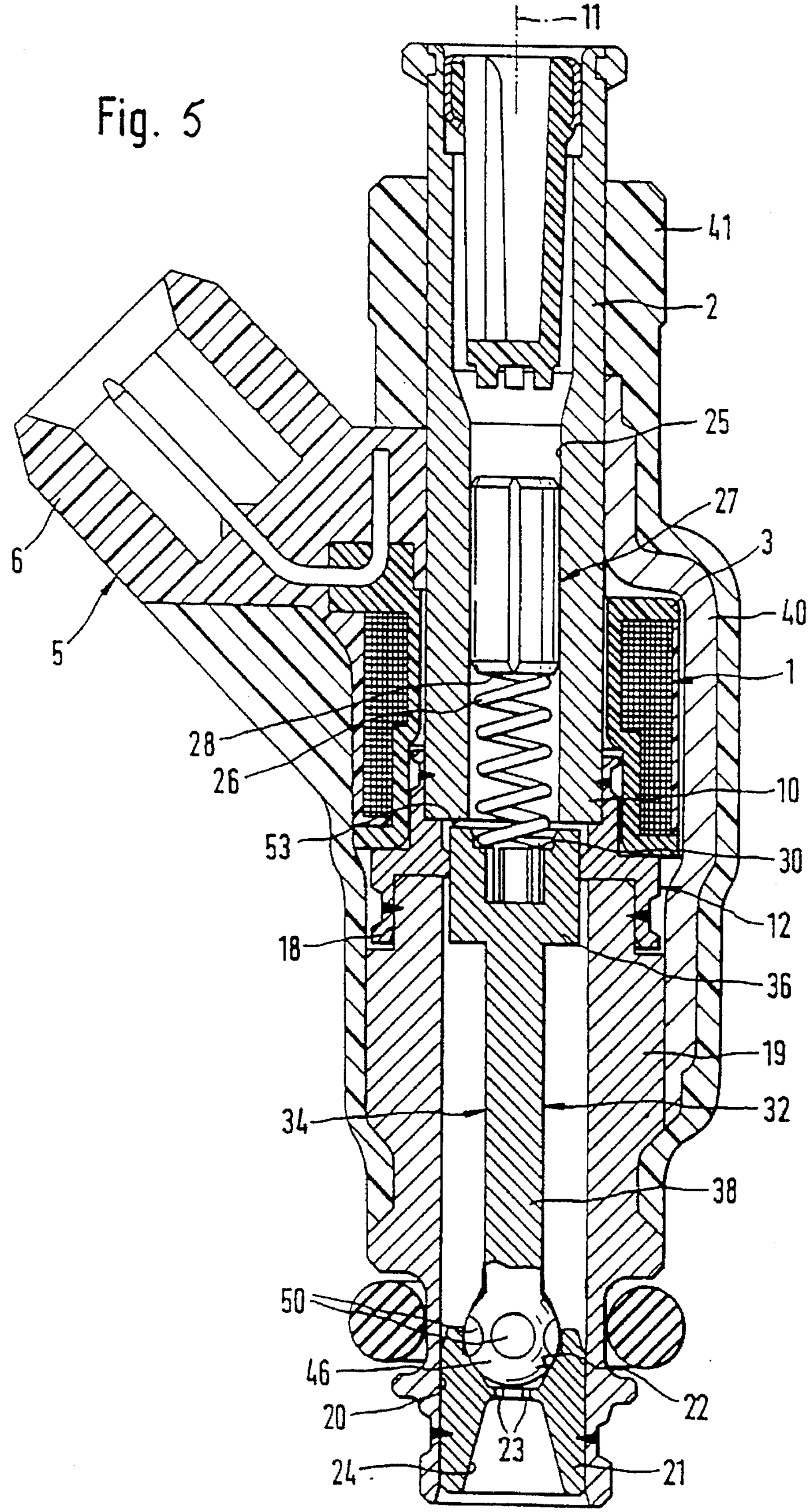
FIG. 5 shows a fuel injection valve with a valve needle according to a second embodiment of the present invention.

A further simplification is obtained if the valve needle 34 is manufactured with armature section 36, valve needle section 38 and valve closing element section 46 as a molded component according to the metal-injection molding method. This eliminates the need to weld the valve closing element section 46 to the valve needle section 38. As shown in FIG. 5, the spherical valve closing element section 46 may also be formed as a single piece with the valve needle section 38 via a metal-injection-molding.

What is claimed is:

1. A valve needle for an electromagnetically actuated injection valve for a fuel injection system of an internal combustion engine, the injection valve having a core element and a fixed valve seat, the core element being at least partially surrounded by a magnetic coil, the valve needle comprising:

an armature section having at least two axially extending flow channels inside the armature section and a central inner recess area, wherein an upstream end face of a valve needle section lies in an axial extension area of the armature section, the upstream end face forming a boundary of said central inner recess area facing a valve closing element section and wherein the armature section includes at least two axial grooves directly connected in the armature section to the inner recess;

wherein the valve closing element section cooperates with the fixed valve seat; and wherein the valve needle section connects the armature section to the valve closing section, the valve needle section having a solid construction, at least one surface of the valve needle section forming a boundary for the at least two axially extending flow channels.

2. The valve needle according to claim 1, wherein the armature section and the valve needle section are manufactured as a single component via a metal-injection-molding, the molding including injection-molding the single component and then sintering the single component.

3. The valve needle according to claim 1, wherein the armature section, the valve needle section and the valve closing element section are manufactured as a single component via a metal-injection-molding.

4. The valve needle according to claim 1, wherein the valve closing element section is connected to an end of the valve needle section facing away from the armature section via a weld joint.

5. The valve needle according to claim 1, wherein the at least two axially extending flow channels formed by the at least one surface of the valve needle section extend in alignment with the at least two axial grooves.

6. A valve needle for an electromagnetically actuated injection valve for a fuel injection system of an internal combustion engine, the injection valve having a core element and a fixed valve seat, the core element being at least partially surrounded by a magnetic coil, the valve needle comprising:

an armature section having at least two axially extending flow channels inside the armature section;

a valve closing element section, the valve closing element section cooperating with the fixed valve seat; and a valve needle section connecting the armature section to the valve closing element section, the valve needle section having a solid construction, at least one surface of the valve needle section forming a boundary for the at least two axially extending flow channels, wherein a downstream end of the valve needle section includes a depression, a gate mark for injection-molding the armature section and the valve needle section being provided in the depression.

wherein the armature section and the valve needle section are manufactured as a single component via a metal-injection-molding, the molding including injection-molding the single component and then sintering the single component.

7. A valve needle for an electromagnetically actuated injection valve for a fuel injection system of an internal combustion engine, the injection valve having a core element and a fixed valve seat, the core element being at least partially surrounded by a magnetic coil and having an inner flow hole for the flow of fuel therethrough, the valve needle comprising:

an armature section having at least two axially extending flow channels therein;

a valve closing element section cooperating with the fixed valve seat; and a valve needle section connecting the armature section to the valve closing element section, wherein the valve needle section has a solid construction and at least one surface of the valve needle section forms a boundary for the at least two axially extending flow channels so that the fuel from the flow hole flows in the direction of the valve closing element section.

8. The valve needle according to claim 7, where in the armature section and the valve needle section are manufactured as a single component via a metal-injection-molding, the molding including injection-molding the single component and then sintering the single component.

9. The valve needle according to claim 7, wherein the armature section, the valve needle section and the valve closing element section are manufactured as a single component via a metal-injection-molding.

10. The valve needle according to claim 7, wherein the valve closing element section is connected via a weld joint to an end of the valve needle section facing away from the armature section.

* * * * *